(12) United States Patent
Davidson (10) Patent No.: US 7,877,863 B2
(45) Date of Patent: Feb. 1, 2011

(54) APPARATUS FOR ROUTING CONDUCTORS IN ELECTRO-MECHANICAL MACHINE HOUSINGS

(75) Inventor: Kyle Davidson, Fishers, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 889 days.

(21) Appl. No.: 11/166,264

(22) Filed: Jun. 27, 2005

(65) Prior Publication Data

US 2006/0288575 A1    Dec. 28, 2006

(51) Int. Cl.
*B23P 19/00* (2006.01)
*H02G 3/04* (2006.01)

(52) U.S. Cl. .............................. 29/732; 29/596; 29/598; 174/72 A; 24/129 R (58) Field of Classification Search .................. 29/729, 29/732–740, 596–598; 174/68.3, 96, 99 R, 174/72 A, 101; 248/49, 68.1; 138/115, 173
See application file for complete search history.

(56) References Cited

U.S. PATENT DOCUMENTS

| | | | | |
|---|---|---|---|---|
| 3,302,350 A | * | 2/1967 | Brown et al. ............... | 52/288.1 |
| 4,569,125 A | * | 2/1986 | Antl et al. .................... | 29/596 |
| 4,864,082 A | * | 9/1989 | Ono et al. ..................... | 174/97 |
| 5,090,108 A | * | 2/1992 | Banner et al. ................. | 29/596 |
| 5,523,529 A | * | 6/1996 | Holliday ..................... | 174/101 |
| 5,597,980 A | * | 1/1997 | Weber ....................... | 174/72 A |
| 5,833,166 A | * | 11/1998 | Newman ................. | 242/432.4 |
| 5,962,814 A | * | 10/1999 | Skipworth et al. .......... | 174/135 |
| 6,087,593 A | * | 7/2000 | Skipworth et al. .......... | 174/135 |
| 6,388,196 B1 | * | 5/2002 | Liu et al. .................... | 174/135 |
| 6,554,230 B1 | * | 4/2003 | Horski ........................ | 248/49 |
| 6,744,166 B2 | * | 6/2004 | Harter et al. ................ | 310/214 |
| 6,747,380 B2 | * | 6/2004 | Bernreuther et al. .......... | 310/71 |
| 6,903,275 B1 | * | 6/2005 | Jetton ....................... | 174/72 A |
| 7,060,908 B2 | * | 6/2006 | Daito ......................... | 174/135 |
| 7,151,222 B1 | * | 12/2006 | Jetton ........................ | 174/68.3 |
| 7,578,047 B2 | * | 8/2009 | Wang et al. .................. | 29/596 |
| 2006/0288575 A1 | * | 12/2006 | Davidson ..................... | 29/854 |

* cited by examiner

*Primary Examiner*—Minh Trinh
(74) *Attorney, Agent, or Firm*—Finnegan, Henderson, Farabow, Garrett & Dunner, LLP (57) ABSTRACT

An apparatus for routing conductors, such as signal carrying conductors, from within an electro-mechanical machine housing to a location outside the housing is provided. The apparatus includes a base for fitting in a first opening in the housing and securing a lower portion of the apparatus to the housing. The apparatus also includes a channel for carrying the conductors, which may be formed in a shape corresponding to a profile of a portion of the housing. The apparatus includes a fastener, such as a snap-type mechanical fastener, for securing the apparatus to the housing.

19 Claims, 13 Drawing Sheets

APPARATUS FOR ROUTING CONDUCTORS IN ELECTRO-MECHANICAL MACHINE HOUSINGS

TECHNICAL FIELD

The present invention generally relates to electrical systems and, more particularly, to routing conductors in electro-mechanical machines. In one example, the present invention provides a channel for routing conductors in a electric motor suitable for use in a hybrid vehicle.

BACKGROUND

Figure 1:
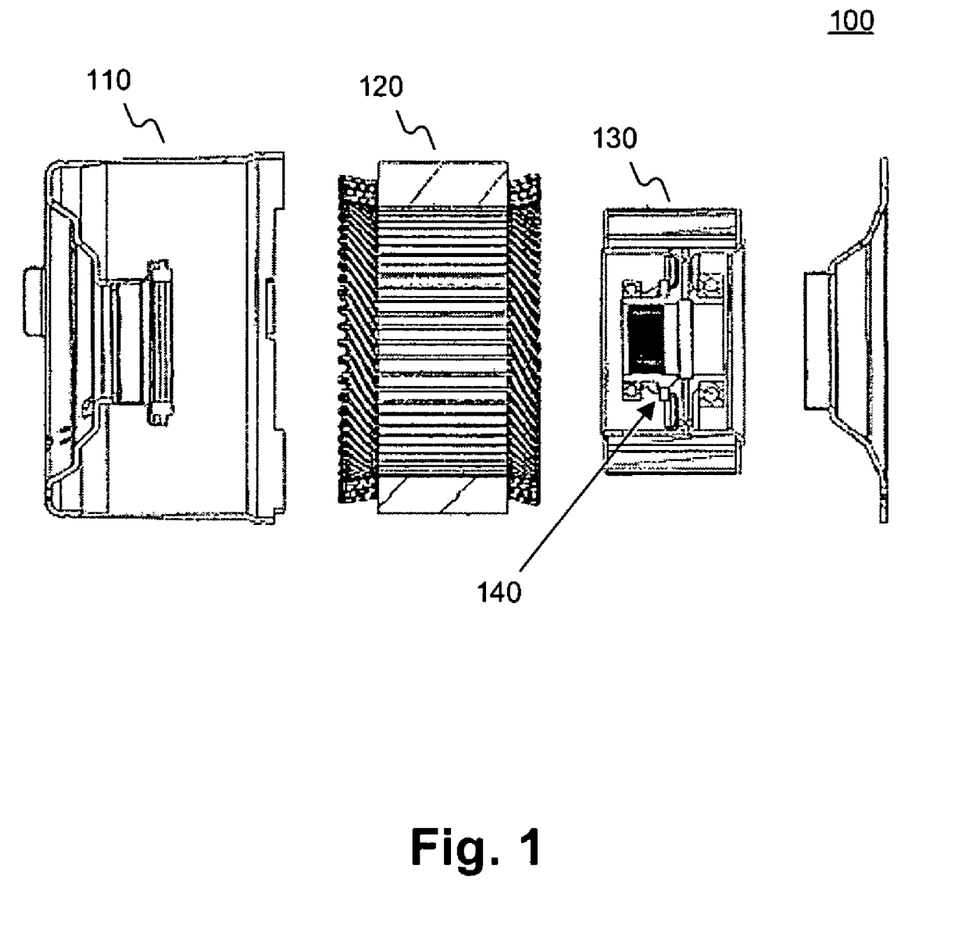
FIG. 1 illustrates an exemplary electric motor assembly.

Electro-mechanical machines are widespread. Rotating electro-mechanical machines, such as electrical motors and dynamoelectric machines (for example, alternators and generators), are particularly prevalent. Rotating electro-mechanical machines usually include a stationary member, known as a "stator," about which a rotating member, known as a "rotor," turns. An example of an electric motor 100 is illustrated in FIG. 1. As depicted in FIG. 1, electric motor 100 may include a housing 110, a stator assembly 120, and a rotor assembly 130.

Often, electrical motors include one or more feedback elements for providing status information associated with motor operation. For example, electrical motors may include electromagnetic feedback devices, such as a "resolver," for providing positional information associated with the rotor and stator. As illustrated in FIG. 1, motor 100 includes a resolver 140 located within housing 110. Electrical motors may also include one or more thermistors for providing temperature information.

Information from feedback devices, such as resolvers and thermistors, is usually in the form of low voltage signals, which are carried by conductors from the feedback devices within the motor housing to various converters, processors, and gauges external to the housing. Typically, these conductors are routed along the inside of the motor housing and secured using an adhesive, such as epoxy. This routing technique, however, has several drawbacks. For example, the technique is usually performed manually and is difficult to implement with consistency in the production process. In addition, using epoxy to secure the conductors to the housing provides the conductors little, if any, protection from hostile conditions (e.g., high temperatures) within the motor. Moreover, motor housings are typically closely packed with various components and provide extremely limited space for routing conductors.

SUMMARY

Systems, apparatus, and methods consistent with the present invention may obviate one or more of the above and/or other issues and drawbacks. Consistent with an aspect of the invention, a channel may be provided for routing conductors in an electro-mechanical machine.

Consistent with the present invention, an apparatus for routing conductors from within an electro-mechanical machine housing to a location outside the electro-mechanical machine housing may be provided. The apparatus may comprise: a base for fitting in a first opening in the housing; a routing channel for carrying the conductors; and a fastener for securing the apparatus to the housing.

Consistent with the present invention, an electro-mechanical system may be provided. The system may comprise: an electro-mechanical machine including a housing, wherein the housing includes a first opening; a feedback device, coupled to the electro-mechanical machine and located within the housing, providing through at least one conductor status information related to a status of the electro-mechanical machine; an external device for receiving from the conductor the status information; and a routing element that attaches to the housing so as to route the conductors from the feedback device within the housing to the external device through the first opening.

Consistent with the present invention, a method of routing conductors from within an electro-mechanical device to an external location may be provided. The method may comprise: generating a routing element in a shape corresponding to a portion of a housing of the electro-mechanical device; configuring the housing of the electro-mechanical device to accept the routing element; inserting the conductors through the routing element such that the conductors enter, from within the housing, a bottom portion of the routing element and exit, to the external location, a top portion of the routing element; and fastening the routing element to the housing of the electro-mechanical device.

The foregoing background and summary are not intended to be comprehensive, but instead serve to help artisans of ordinary skill understand implementations consistent with the present invention as set forth in the appended claims. In addition, the foregoing background and summary are not intended to provide any independent limitations on the claimed invention or equivalents thereof.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with the invention. Other implementations and embodiments may be used and structural and procedural changes may be made without departing from the scope of present invention.

Figure 2:
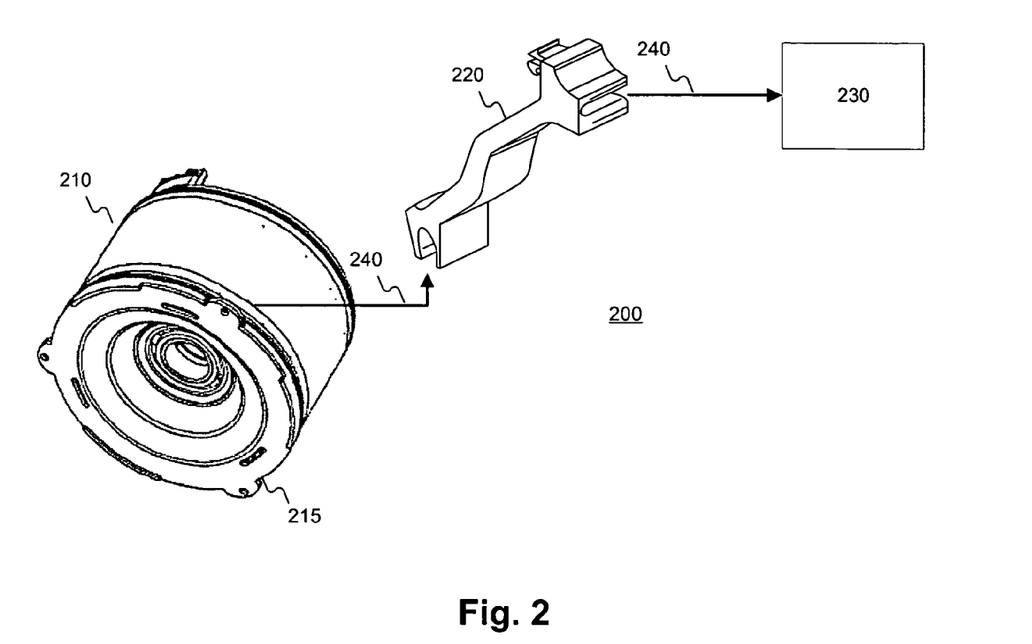
FIG. 2. illustrates an exemplary system, consistent with the present invention.

FIG. 2 illustrates an exemplary system 200, consistent with the present invention. As illustrated in FIG. 2, system 200 may include a conductor routing element 220, which routes conductors 240 from an electro-mechanical machine 210 to one or more external devices 230. The number of components in system 200 is not limited to what is shown and other variations in the number of arrangements of components are possible, consistent with the present invention. Further, depending on the implementation, elements of system 200 may lack certain illustrated components and/or contain, or be coupled to, additional or varying components not shown.

System 200 may represent any electro-mechanical system in which an electro-mechanical machine is used. Non-limiting examples include automotive, material handling, marine, power generator, and lawn/garden systems and subsystems For example, system 200 may include an electrical system (for example, a charging system) in a vehicle. System 200 may include various components and accessories (not shown), depending on the application. For example, system 200 may include one or more batteries, starters, switches, fuses, lamps, radios, sensors, gauges, etc. System 200 may include one or more DC components and/or one or more AC components (single- or poly-phase).

Electro-mechanical machine 210 may include a variety of machines, such as machines that convert electrical energy into mechanical energy (e.g., AC and DC motors), machines that convert mechanical energy into electrical energy (i.e., dynamoelectric machines), meters, torquers, etc. In one embodiment, electro-mechanical machine 210 may include an electrical motor (either AC or DC) suitable for providing propulsion power. Electro-mechanical machine 210 may include or be coupled to various components known in the art, such as a housing, stator assemblies, solenoid assemblies, controllers, pulleys, belts, springs, gears, brushes, casings, brackets, valves, seals, pins, sensors, terminals, external fan assemblies, apertures, regulators, rectifiers, conductors, etc. Electro-mechanical machine 210 may also include one or more resolvers and thermistors that generate low voltage signals representing positional and temperature information.

In one particular implementation, system 200 may include a hybrid vehicle system. As used herein the term "hybrid" refers to the use of two or more sources of power. Non-limiting examples of hybrid vehicle systems include gasoline-electric systems, diesel-electric systems, steam (piston or turbine)—electric systems, and nuclear-electric systems. In such an implementation, electro-mechanical machine 220 may include an electric motor suitable for use in a hybrid drive system. In addition to electro-mechanical machine 210, system 200 may also include an additional power source (not shown), such as an internal combustion engine. Electro-mechanical machine 210 and the additional power source(s) may operate in a parallel configuration, in which both power sources provide propulsion simultaneously, or a series configuration, in which electro-mechanical machine 210 provides propulsion and the additional power source is used to power electro-mechanical machine 210. Additionally, when implemented in a hybrid vehicle application, system 200 may include various hybrid components known in the art, such as a batteries, fuel tanks, control elements, generators, a transmission, a drive train, etc.

Conductor routing element 220 may route conductors 240 from within electro-mechanical machine 210 to external devices 230. As used herein, the term "conductor" refers to any medium capable of transporting electrical energy and/or communications signals, such as an elongated strand of drawn metal (i.e., a wire) or fiber optic cable. Non-limiting examples of conductors include elongated strands (insulated or non-insulated) of platinum, silver, iron, copper, aluminum, gold, brass alloys, and bronze alloys. In one example, conductors 240 may include a plurality of conductors bundled in an insulated ribbon. Conductors 240 may be coupled to various components, such as feedback devices (e.g., resolvers, thermistors, etc.), within electro-mechanical machine 210. Conductors 240 may be destined to one or more external devices 230, which are discussed below.

Conductor routing element 220 may be constructed from various materials, such as glass-filled nylon, polypthalamade (PPA), acrylonitrile-butadiene-styrene, polyacetals, thermoplastic polyimides, polyaryletherketones, liquid crystal polymers, or any other suitable material. The particular material may vary depending on the application. The particular material may be chosen based on its flexibility and rigidity. For example, the material may need to withstand given pull forces and allow a full range of clip flexibility. The material may also be chosen based on temperature ratings. For example, the material may need to withstand temperatures of 150-180 Celsius. In one particular implementation, conductor routing element 220 may be formed from 13% glass-filled nylon. Other materials may be used and conductor routing element 220 may even be formed from a plurality of different materials.

Conductor routing element 220 may be formed using various techniques known in the art, such as molding, casting, etc. The particular forming technique used will depend on the application requirements.

Conductor routing element 220 may route, form, and protect conductors 240 originating from within electro-mechanical machine 210 and destined for external device 230. Conductor routing element 220 may attach to electro-mechanical machine 210 by way of electro-mechanical machine housing 215. Details of an exemplary implementation of conductor routing element 220, as well as its attachment to electro-mechanical machine housing 215, are provided below in connection with FIGS. 3A-3C.

Referring again to FIG. 2, external device 230 may include any suitable combination of hardware, software, or firmware that processes, uses, or displays, signals from conductors in electro-mechanical machine 210. External device 230 may accept signals (e.g., low voltage analog signals generated from a resolver) and process those signals to produce, for example, position, speed, and/or RPM information associated with electro-mechanical machine 210. In one embodiment, external device 230 may include a microcontroller or other suitable processing device. External devices 230 may also include various sensors, gauges, displays, interfaces, etc.

FIGS. 3A-3I collectively illustrate aspects of an exemplary implementation of conductor routing element 220, consistent with the present invention. The configuration of routing element 220 is not limited to what is shown, and other variations in the number, shape, and arrangement of components are possible, consistent with the present invention. Further, depending on the implementation, routing element 220 may lack certain illustrated components and/or contain, or be coupled to, additional or varying components not shown.

Figure 3A:
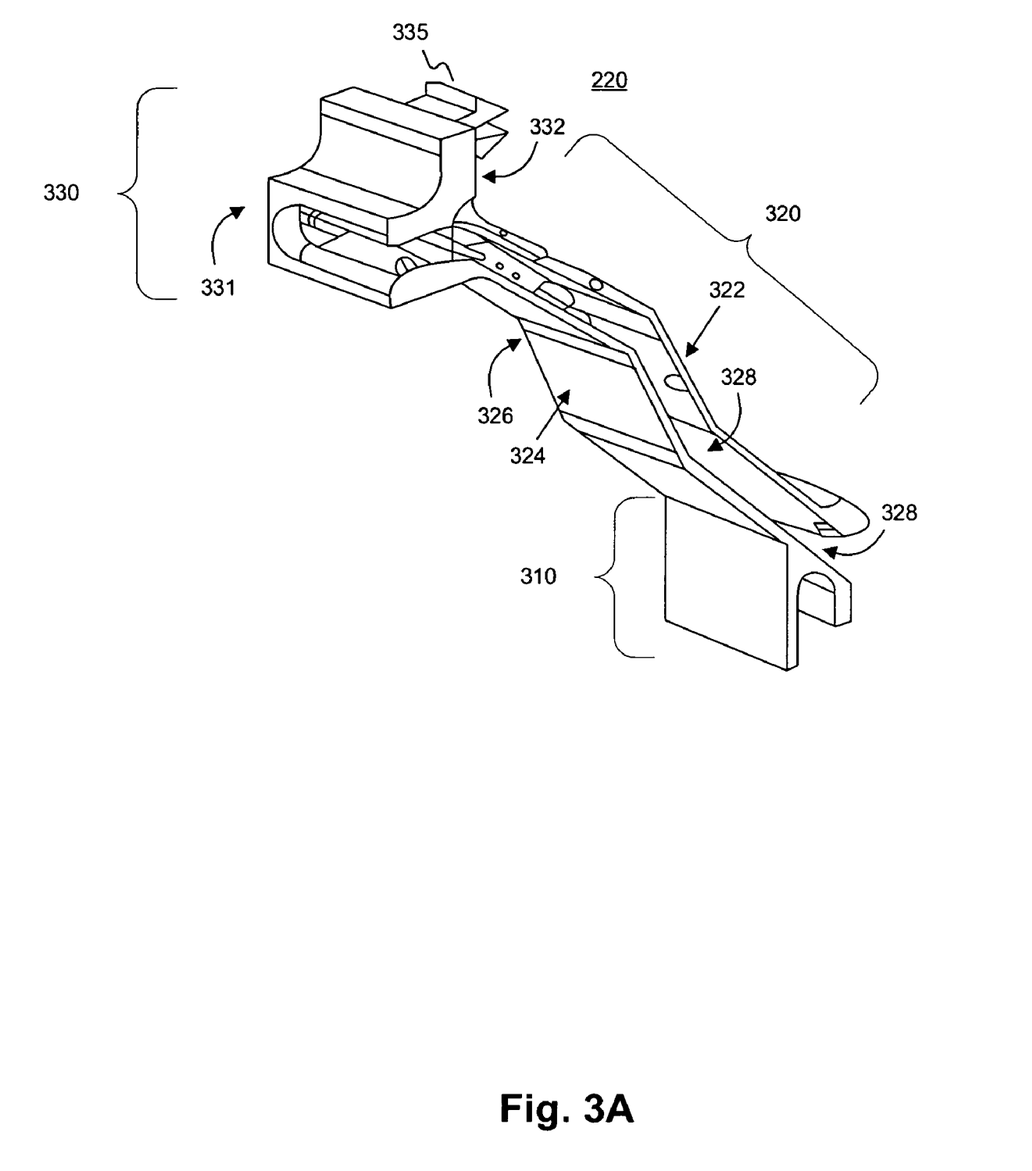
FIGS. 3A-3I collectively illustrate an exemplary conductor routing element, consistent with the present invention.

As illustrated in FIG. 3A, conductor routing element 220 may include a base portion 310, a body portion 320, and a head portion 330. Head portion 330 may further include a fastening portion 335. In one implementation, each of portions 310, 320, 330, and 335 may be formed from the same material and collectively constitute a single element. In alternative embodiments, one or more of portions 310, 320, 330, and 335 could be formed separately and/or be detachable from other portions.

Figure 3B:
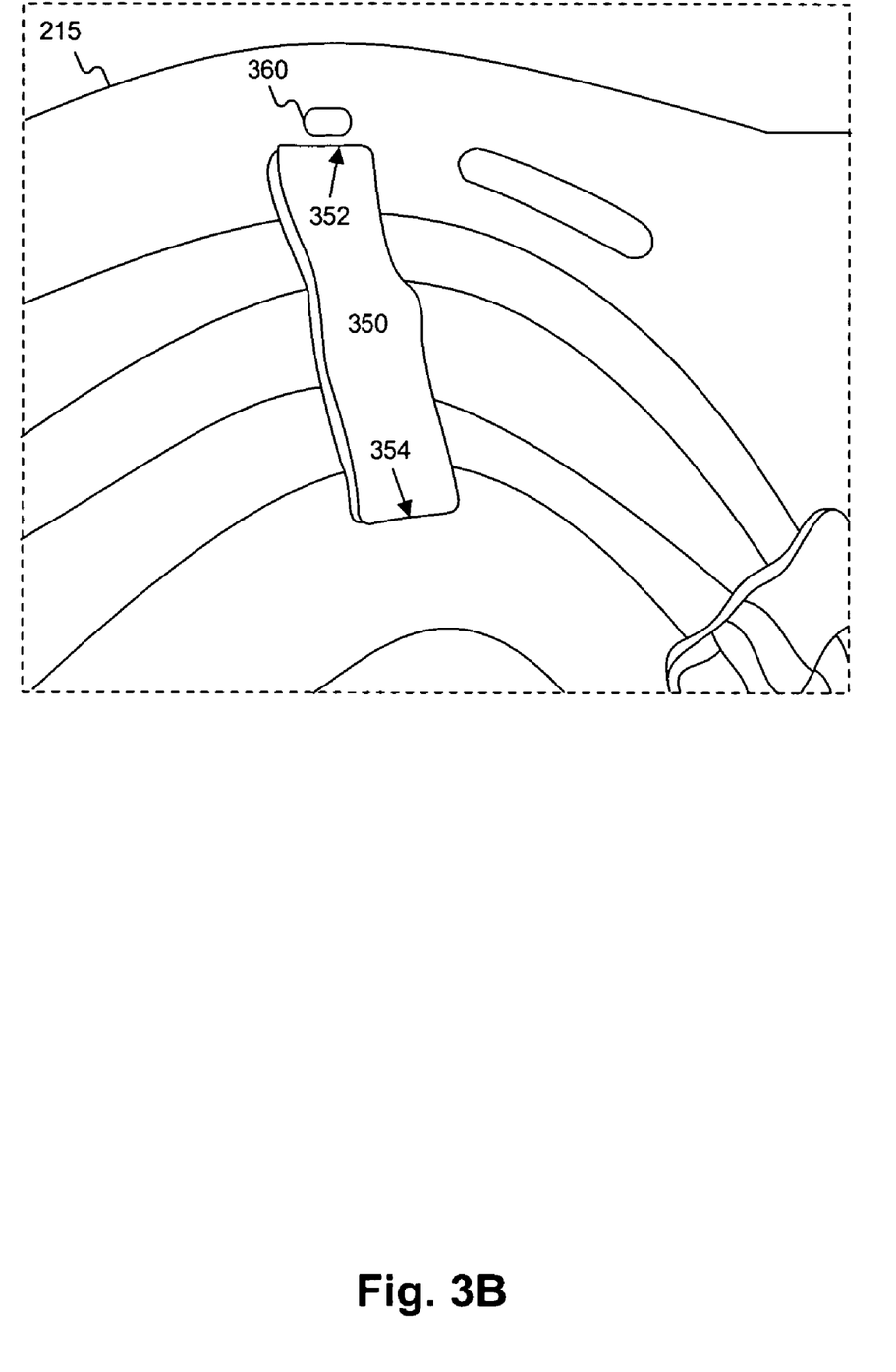
Figure 3C:
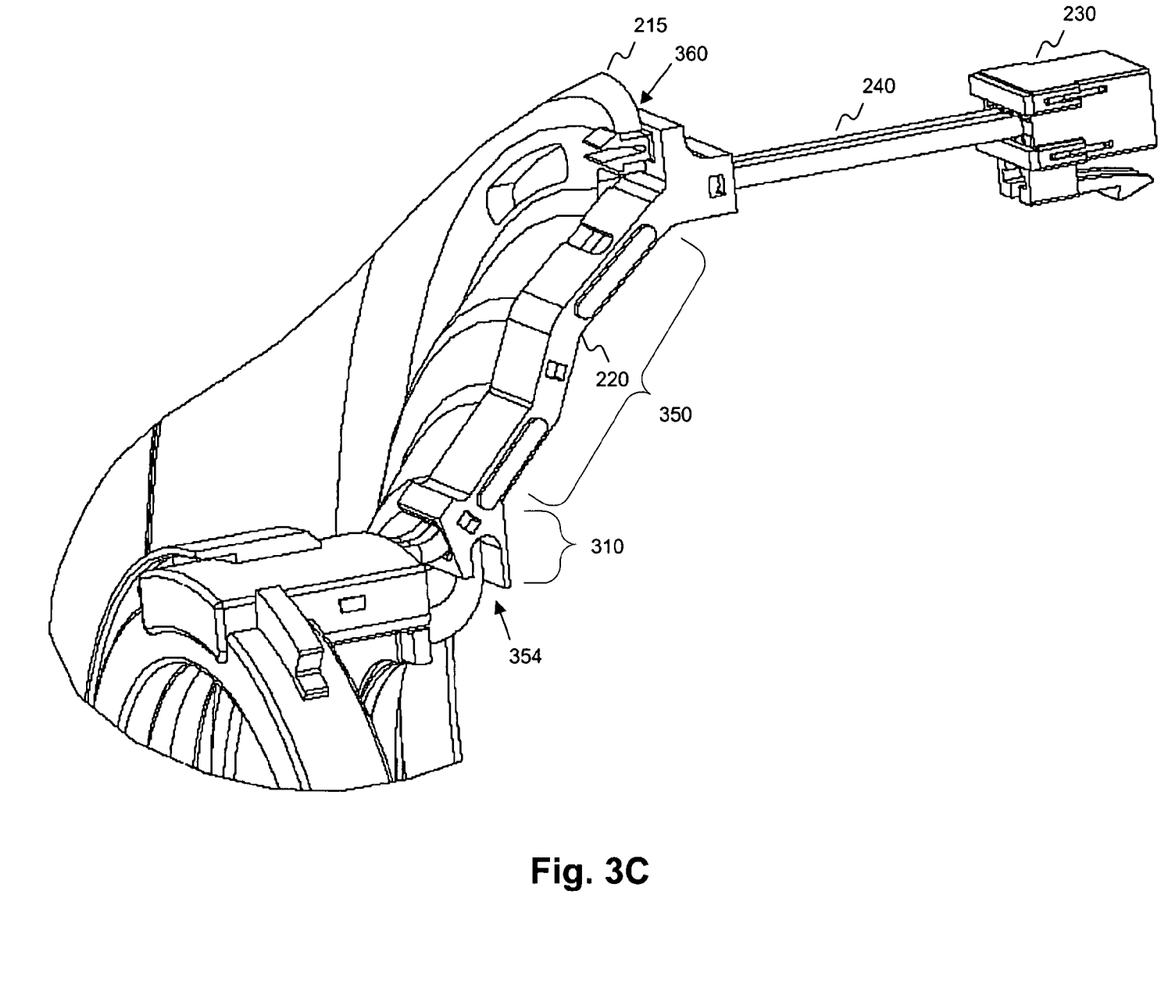

Referring to FIGS. 3B and 3C, conductor routing element 220 may attach to electro-mechanical machine 210 by way of housing 215. Housing 215 may be formed from various materials, such as machined brass, bronze, thermoplasts, iron, steel, stainless steel, nickelized brass, and nickelized bronze. As illustrated in FIG. 3B, housing 215 may include an opening for receiving all or part of routing element 220, such as a slot 350 with a top portion 352 and a bottom portion 354, and a fastening opening 360 that may receive fastening portion 335. The particular size and shape of slot 350 and fastening opening 360 will vary depending upon the application and the size and shape of conductor routing element 220. Slot 350 may be appropriately sized and shaped to accommodate body portion 320 of routing element 220. In one example, slot 350 may be rectangular shaped with a length of 4.50 mm and a width of 10.00 mm. Fastening opening 360 may be appropriately shaped to receive fastening portion 335 of head portion 330. In one example, fastening opening 360 may be circular in shape, with a 3.85 mm diameter. Fastening opening 360 could also be rectangular. As illustrated in FIG. 3C, when routing element 220 is secured to housing 215, base portion 310 rests on bottom portion 354 of slot 350 while fastening portion 335 or head portion 330 extends through fastening opening 360.

The shape and arrangement of slot 350 and fastening opening 360 are not limited to the examples illustrated in FIGS. 3B and 3C. In one alternative embodiment, slot 350 may be substantially smaller than body portion 320 of routing element 220 and be sized sufficiently to allow conductors to exit housing 215. In such an embodiment, base portion 310 could fit into slot 350 and all or part of body portion 320 could run along the outside of housing 215. In another alternative embodiment, housing 215 may include one or more additional openings (not illustrated).

Referring again to FIG. 3A, base portion 310 of conductor routing element 220 may be appropriately shaped and sized to fit over bottom portion 354 of housing 215. In the example illustrated in FIG. 3A, base portion 310 may be "U" shaped with a 5.0 mm diameter. Base portion 310 may be "U" shaped to sit over portion 354 of housing 215 and to secure the lower body of routing element 220 to housing 215. Base portion 310 may be formed in various other shapes and sizes depending upon the size and shape of the particular housing. Base portion 310 could also be configured to include a snap or other appropriate mechanical fastener to secure routing element 220 to housing 215.

Body portion 320 may be formed so as to carry conductors from within housing 215 to a location external to the housing. As illustrated in FIGS. 3A, body portion 320 may include an inner face 322, which faces inside housing 215, and an outer face 324, which faces outside housing 215. Inner face 322 and outer face 324 may run substantially parallel to each other and may be joined by a side face 326. An open region or "channel" 328 may exist between faces 322, 324, and 326. In certain embodiments, body portion 320 may include an additional side face (not shown) that runs substantially parallel to side face 326, and channel 328 may be completely closed in by the faces. The particular size and shape of inner face 322, outer face 324, and side face 326 (and the optional additional side face) may depend upon the shape and size of housing 215 as well as the number, shape, and size of the conductors that require routing. In one example, as depicted in FIGS. 3A-3C, the shape of body portion 320, including channel 328, may correspond to the profile of housing 215 or a portion thereof. For example, all or part of body portion 320 may be shaped to correspond to the profile of slot 350 in housing 215. Body portion 320 may include one or more segments that follow the contour of housing 215 (e.g., slot 350). The particular number of segments as well as the particular size and shape of the segments may vary depending upon the size and shape of housing 215.

Body portion 320 may carry one or more conductors in channel 328, which is formed between inner face 322, outer face 324, and side face 326. In one example, channel 328 may be sized to accommodate a ribbon-type conductor bundle including seven (7) signal carrying conductors and/or ground wires. The particular shape and size of channel 328 (and therefore inner face 322, outer face 324, side face 326, and any optional additional side face) will vary depending on the application.

Figure 3D:
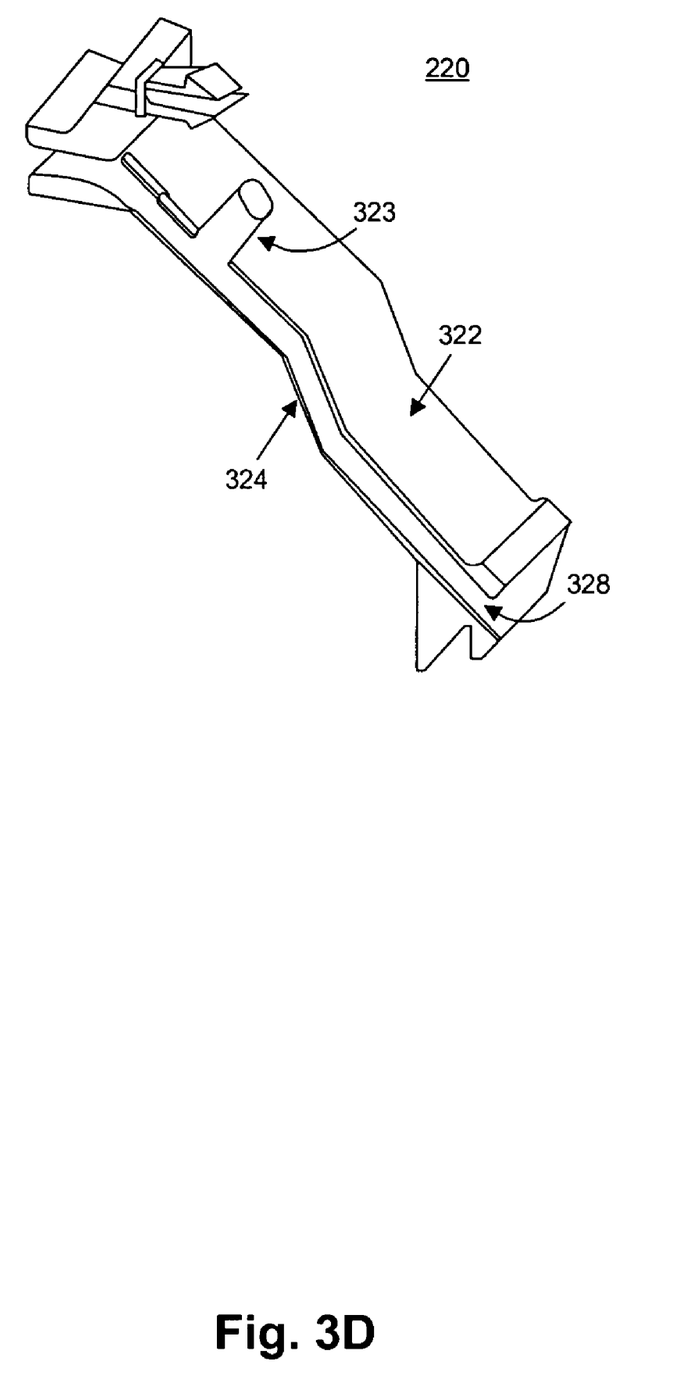

In one exemplary configuration, as depicted in FIG. 3D, inner face 322 may include one or more notches or cut-outs (e.g., 323) to allow wires destined for or originating from components within housing 215 (e.g., a thermistor) to enter and exit channel 328. For example, cut-out 323 may accommodate four (4) signal carrying wires originating from a thermistor within housing 215 and destined for one or more temperature sensors located outside housing 215. The particular shape and size of cut-out 323 may vary depending on the application. Further, cut-out 323 is optional and may not be included in certain implementations of body portion 320.

Figure 3E:
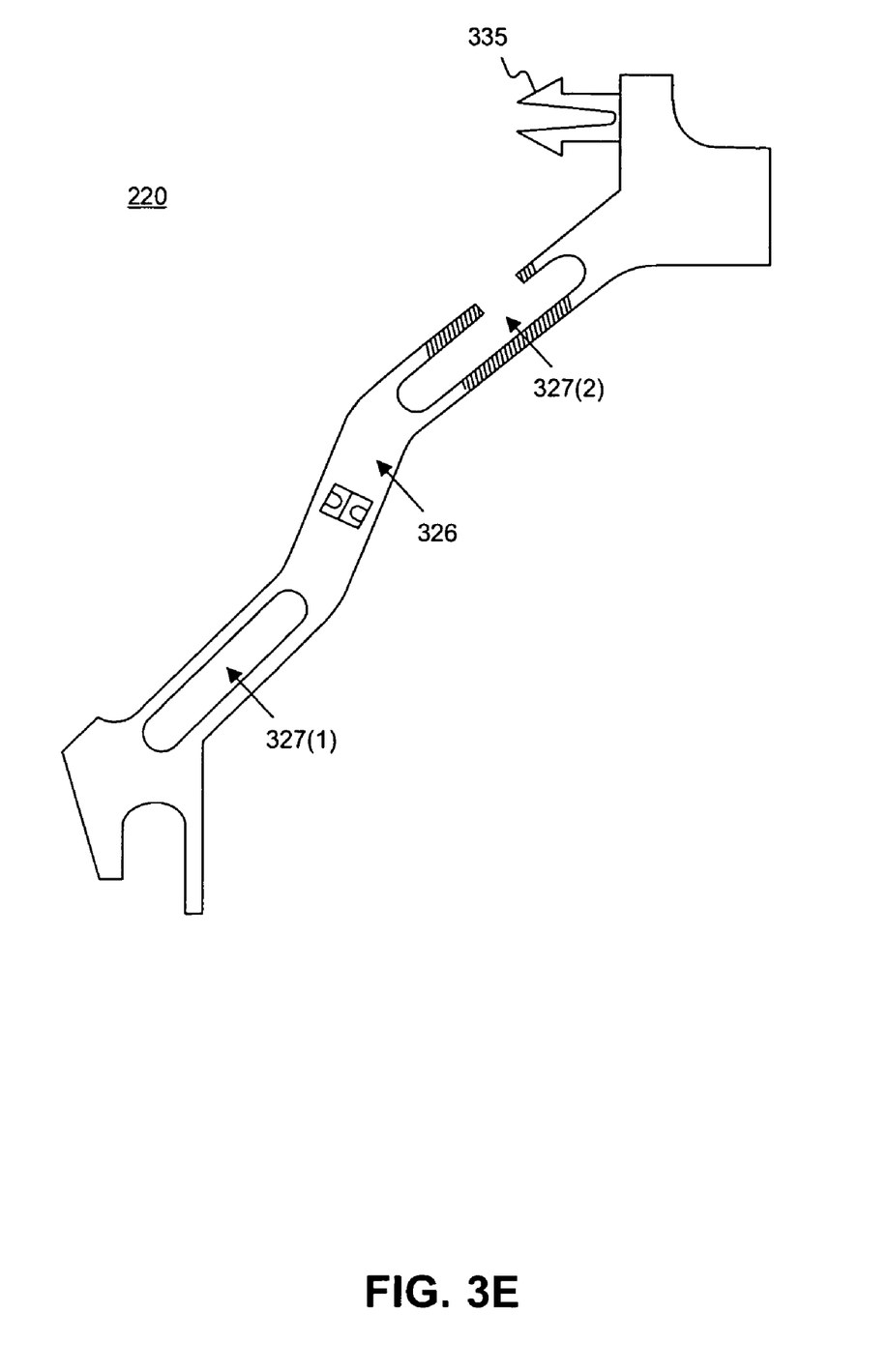

As mentioned above, inner face 322 and outer face 324 may run substantially parallel to each other and may be joined by a side face 326. FIG. 3E illustrates an exemplary implementation of side face 326. As illustrated, side face 326 may be substantially solid, with one or more bosses or stand offs (e.g., 327(1) and 327(2)) for centering and/or aligning routing element 220. If body portion 320 includes an additional side face, as mentioned above, the additional side face may also be substantially solid, with one or more bosses or stand offs.

Referring back to FIG. 3A, head portion 330 may include an output portion 331 that faces outside housing 215 and through which conductors in channel 328 may exit. In one example, as illustrated in FIGS. 3A, output portion 331 may include a top, bottom, and side that form a continuation of channel 328 through outer portion 331. Head portion 330 may also include inner wall 332 that extends upward from inner face 322 of body portion 320. Inner wall 332 may be formed in a shape and size corresponding to housing 215. Inner wall 332 may rest against housing 215 when wire routing element 220 is secured to housing 215.

Consistent with the present invention, head portion 330 may include a fastening portion 335 for securing routing element 220 to housing 215. Fastening portion 335 may include any suitable structure or and/or medium for securing routing element 220 to housing 215. In one embodiment, fastening portion 335 may include one or more moveable and/or deformable components for mechanically fastening routing element 220 to housing 215. Fastening portion 335 may also include unmovable and/or non-deformable components (e.g., a screw or other rigid mechanical fastener) for mechanically fastening routing element to housing 215.

In alternative embodiments, fastening portion 335 may include or utilize an adhesive to secure routing element 220 to housing 215. In such alternative embodiments, fastening opening 360 may be unnecessary. Fastening portion 335 may be formed in various shapes and designs, depending on the particular application.

Figure 3F:
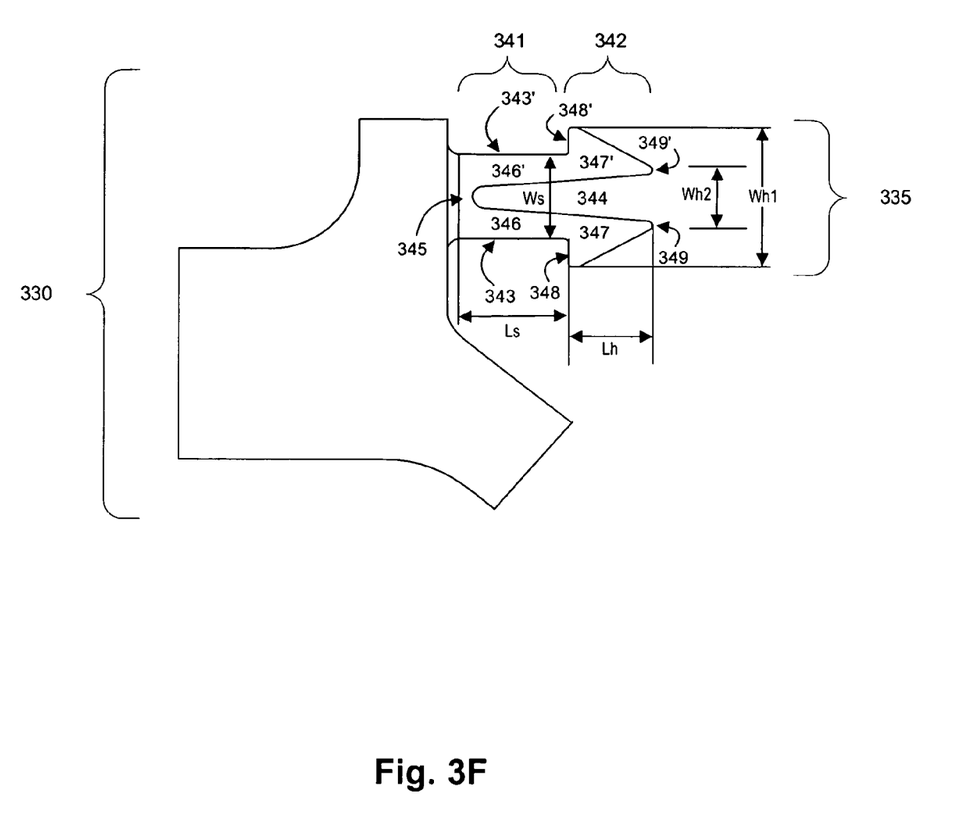

FIG. 3F illustrates one exemplary implementation of fastening portion 335, consistent with the present invention. In the illustrated example, fastening portion 335 may be configured as a compressible snap-type fastener. Fastening portion 335 may extend outward from inner wall 332 in a direction opposite outer portion 331. Fastening portion 335 may insert into fastening opening 360 and prevent pull-through. As depicted in FIG. 3F, fastening portion 335 may include a stem region 341, having a width (Ws) and a length (Ls), and a head region 342, having a length (Lh) and width that tapers from a first width (Wh1) to a second width (Wh2). Fastening portion 335 may be shaped and sized based upon the shape and size of housing 215. For example, the length of stem region 341 (Ls) may be based on the thickness of housing 215 and the width of stem region 341 (Ws) may correspond to the size of fastening opening 360 in housing 215. In one example, the stem region may be 5.10 mm in length and 3.80 mm wide.

As illustrated in FIG. 3F, fastening portion 335 may be substantially mushroom shaped and may include one or more fastening members (e.g., 343 and 343') separated by a continuous space 344. The fastening members (343 and 343') may be identical or substantially identical to each other and may join at a base 345 located in stem region 341. The fastening members may also be equidistant from a central axis running through fastening portion 335. Fastening members 343 and 343' may be formed in a variety of shapes and sizes. For example, as illustrated in FIGS. 3A-3C, each member (343, 343') may include a shaft (346, 346') that extends the distance of stem region 341 and a lobe (347, 347') that extends the distance of head region 342. The lobe (347, 347') may include a hook-type edge (348, 348') that extends out from the shaft (346, 346') in a perpendicular fashion and a tapered tip portion (349, 349'). In one example, the hook-type edge (348, 348') may extend out approximately 1.1 mm from the shaft. The tip portion (349, 349') may be substantially pointed or flat. The lobe (347, 347') may be appropriately shaped to allow fastening portion to pass through opening 360 and while preventing pull-through. In one example, as illustrated in FIG. 3F, the lobe may be arrow-shaped or wedge-shaped.

In operation, the tapered tip portions (348, 348') of the fastening members (343 and 343') are inserted into fastening opening 360 of housing 215. As the fastening members are inserted into opening 360, the fastening members compress to allow head region 342 to pass through fastening opening 360. Once head region 342 passes through opening 360, the fastening members (343 and 343') return or "snap" back to their original position, locking fastening portion 335 to housing 215.

Fastening portion 335 is not limited to the illustrated configuration, and various alternative shapes, sizes, and configurations may be used. For example, fastening portion 335 may include several (e.g., 3 or 4) fastening members. In addition, the shape of the fastening member shafts (e.g., 346, 346') may be cylindrical, hemispherical, semi-circular, rectangular, etc. Also, the lobes (e.g., 347, 347') may be arrow-shaped, mushroom-shaped, cone-shaped, pyramid shaped, etc. Further, the fastening members (e.g., 343, 343') may not be joined at a base and instead be completely separated by continuous space 344.

Figure 3G:
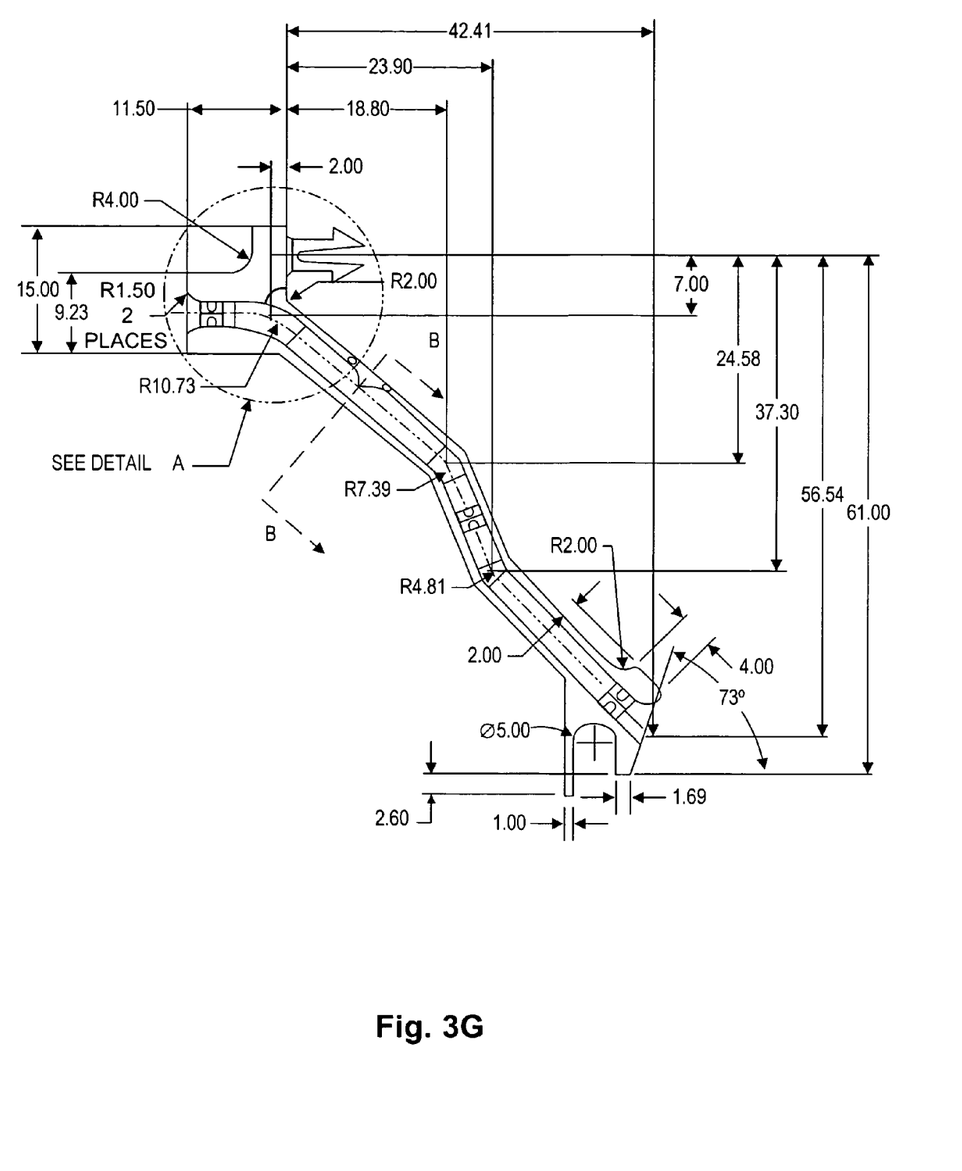
Figure 3H:
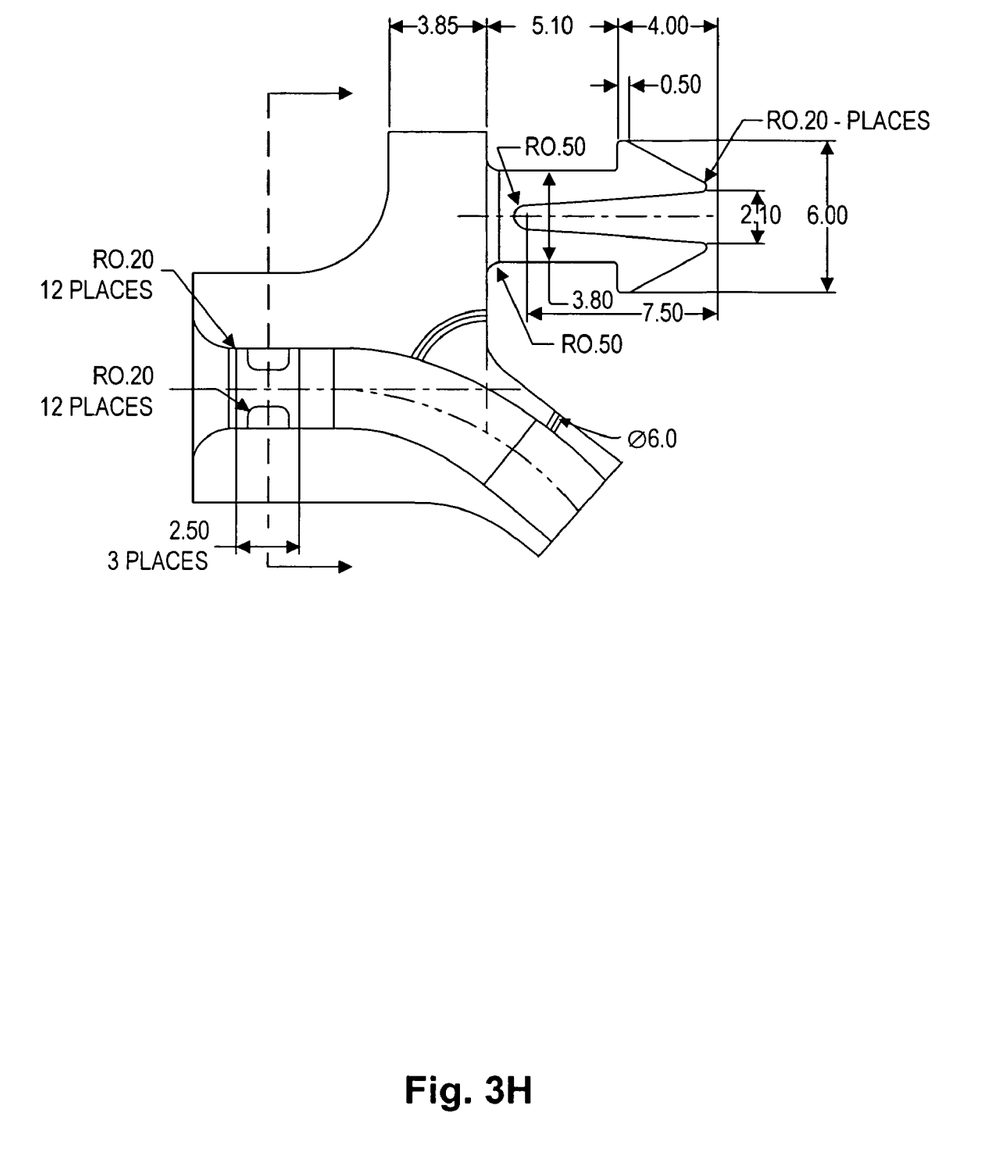
Figure 3I:
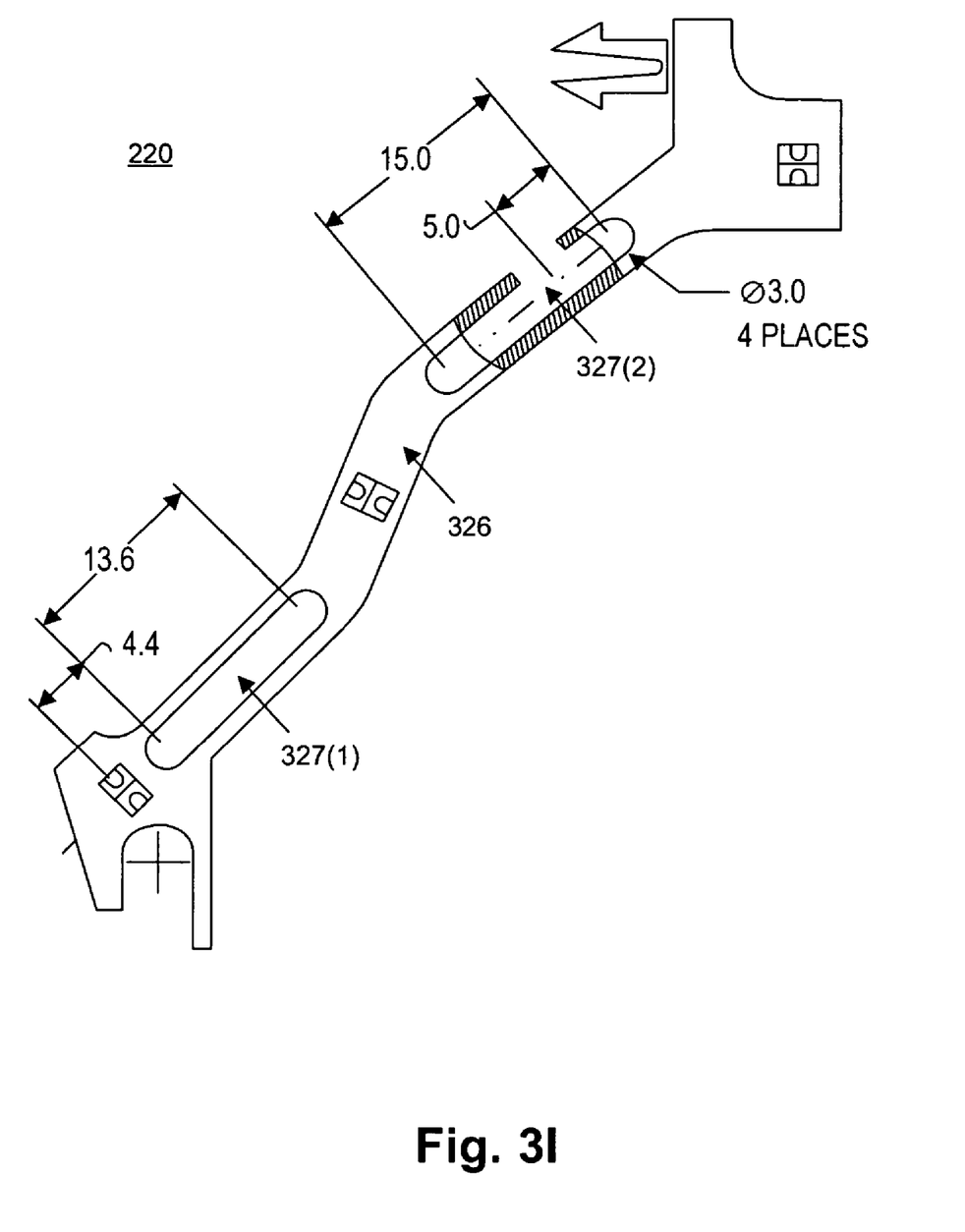

As discussed above, the various dimensions of conductor routing element 220 may vary depending on the particular application. FIGS. 3G-3I illustrate exemplary dimensions, in millimeters, of one particular implementation of conductor routing element 220. The illustrated dimensions are exemplary only, and other dimensions may be used, consistent with the present invention.

Figure 4:
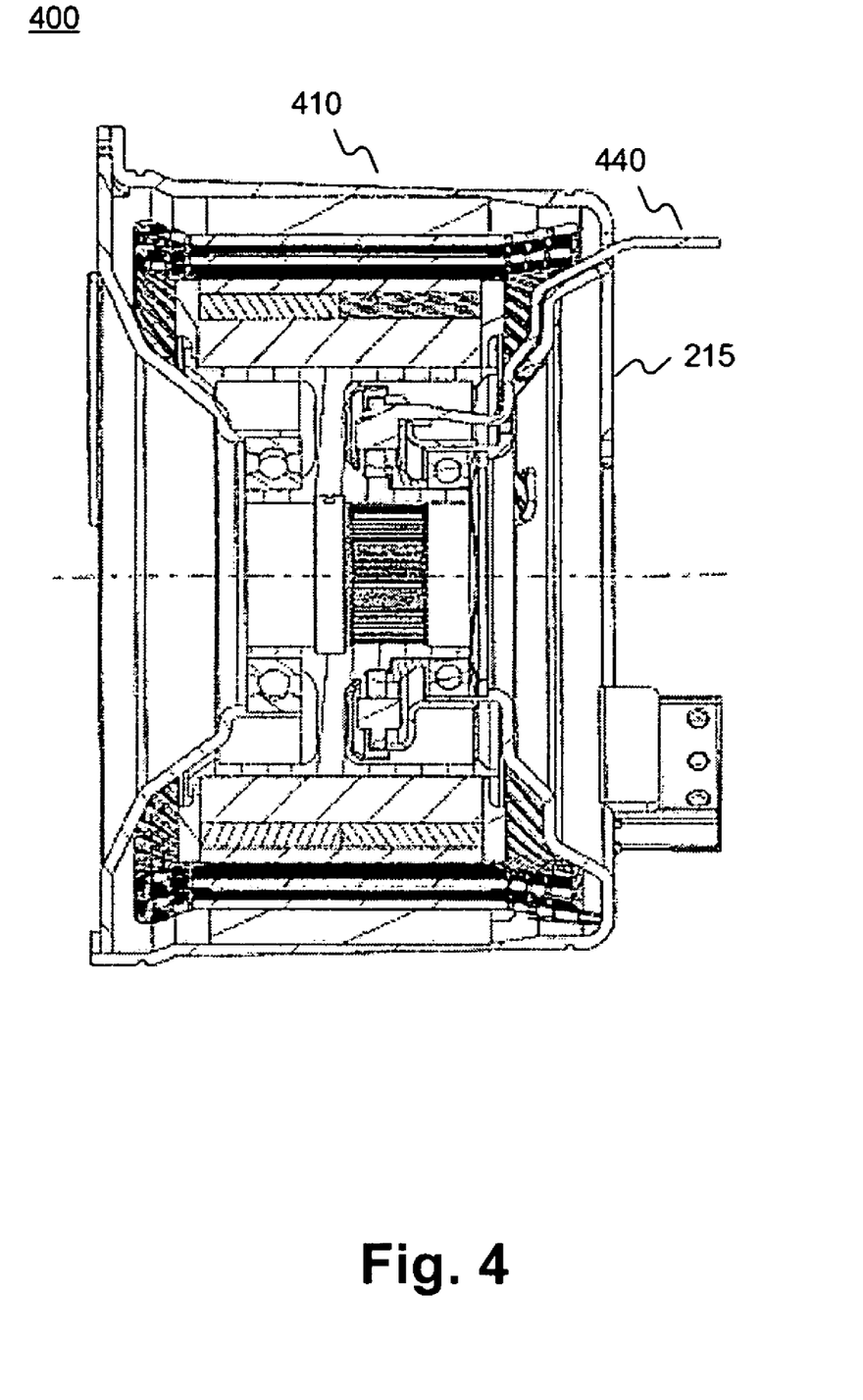
FIG. 4 illustrates a cross-sectional view of an exemplary motor assembly, consistent with the present invention.

FIG. 4 illustrates a cross-sectional view 400 of an exemplary motor assembly 410 to which routing element 220 may be attached. As illustrated, one or more conductors 440 may be routed from within assembly 410 to one or more external devices (not shown). Conductor routing element 220 (not illustrated in FIG. 4) may be appropriately shaped to follow the contours of assembly 410 and may route conducts 440, via channel 328, from within assembly 410 to the external locations. Routing element 220 may attach to housing 215 by way of its slot 350 and fastening opening 360 (not illustrated in FIG. 4 but an example of which is illustrated in FIG. 3B).

For purposes of explanation only, aspects of system 200, including conductor routing element 220, are described with reference to the elements and components illustrated in FIGS. 2-4. The number, shape and arrangement of components in system 200, including conductor routing element 220, are not limited to what is shown and other variations in the number, shape and arrangement of components are possible, consistent with the present invention. Further, depending on the implementation, system 200 and conductor routing element 220 may lack certain illustrated components and/or contain, or be coupled to, additional or varying components not shown.

Figure 5:
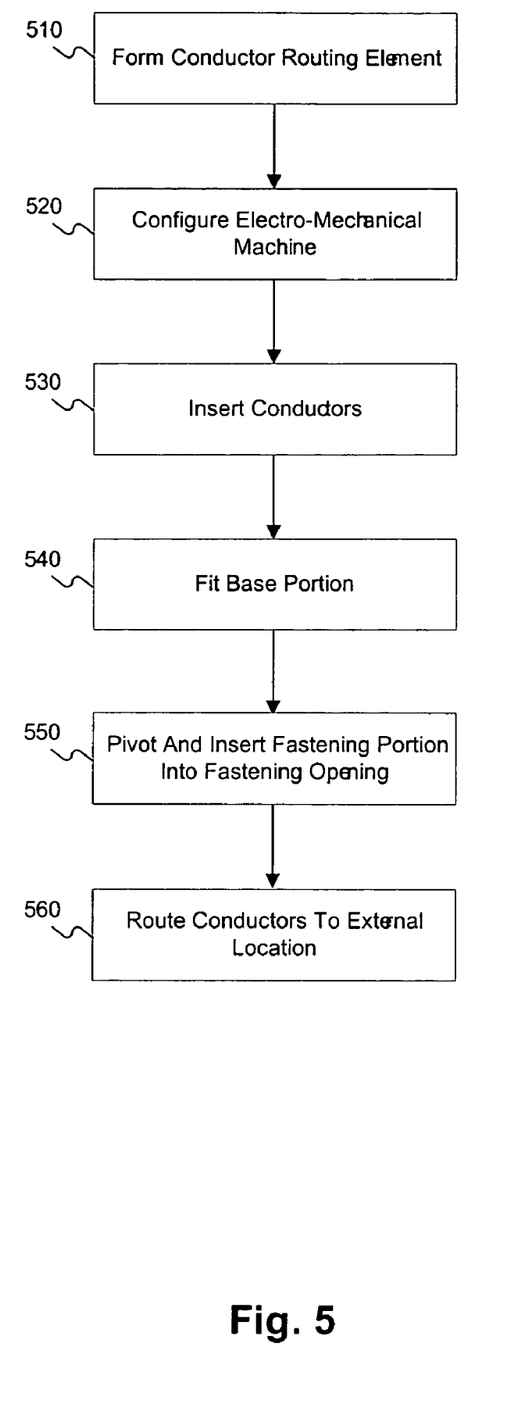
FIG. 5 illustrates a flowchart of an exemplary method of attaching a conductor routing element to an electro-mechanical machine, consistent with the present invention.

FIG. 5 is a flowchart depicting an exemplary method 500 of attaching conductor routing element 220 to an electro-mechanical machine, consistent with the present invention.

Method 500 may begin by forming conductor routing element 220 (step 510). Forming conductor routing element 220 may include thermoforming, injection molding, pressure forming, forging, casting and/or machining. Routing element 220 may be formed in the configuration described above in connection with FIGS. 3A-3I. In one example, forming routing element 220 may comprise forming routing element 220 in a shape corresponding to the profile of a portion of housing 215.

Method 500 may also include configuring the electro-mechanical machine to accept routing element 220 (step 520). Configuring the electro-mechanical machine may include, for example, forming a housing (e.g., 215) of the electro-mechanical machine. Forming the housing may include forging, casting and/or machining the housing to include one or more openings, such as slot 350 and fastening opening 360, for receiving conductor routing element 220. For clarity of explanation, the following discussion of method 500 refers to housing 215.

After conductor routing element 220 and housing 215 are appropriately formed, conductors requiring routing (e.g., 240, 440) may be inserted into channel 328 of routing element 220 (step 530). This phase may optionally include inserting or routing conductors through cut-out 323 of routing element 220.

Once the conductors are inserted in channel 328 of routing element 220, base portion 310 may be fitted over bottom portion 354 of housing 215 (step 540). Routing element 220 may then pivot on base portion 310 such that the tapered tip portions (348, 348') of the fastening members (343 and 343') are inserted into fastening opening 360 of housing 215 (step 550). As the fastening members are inserted into opening 360, the fastening members compress to allow head region 341 to pass through fastening opening 360. After head region 342 passes through opening 360, the fastening members (343 and 343') "snap" back to their original position, locking fastening portion 335 to housing 215. Once routing element 220 is fastened to the electro-mechanical machine, the conductors may be routed out of routing element 220 to one or more external locations, such as external devices 230 (560).

FIG. 5 is consistent with an exemplary implementation of the present invention. Further, the sequence of events described in connection with FIG. 5 is exemplary and not intended to be limiting. Other steps may therefore be used, and even with the method depicted in FIG. 5, the particular order of events may vary without departing from the scope of the present invention. For example, the conductors may be inserted in channel 328 of routing element 220 after base portion 310 is fitted over bottom portion 354 of housing 215 rather than before base portion 310 is fitted. In addition, the electro-mechanical machine may be configured to accept a routing element first, and then routing element 220 may be formed appropriately to fit the machine. That is, routing element 220 could be tailored to the specific shape and size of housing 215, or housing 215 could be tailored to accommodate routing element 220.

Furthermore, the illustrated steps of FIG. 5 may overlap and/or may exist in fewer steps. Moreover, certain steps may not be present and additional steps may be implemented in method 500. The illustrated steps may also be modified without departing from the scope of the present invention and its embodiments. In addition, method 500 is not inherently related to any particular apparatus or system and may be implemented in conjunction with any suitable combination of components.

Also, all or part of method 500 may be performed with or without operator intervention. In one example, method 500 may be performed automatically by one or more automated machines or tools during an assembly process. In other examples, one or more steps of method 500 may be performed manually.

The foregoing description of possible implementations consistent with the present invention does not represent a comprehensive list of all such implementations or all variations of the implementations described. The description of only some implementations should not be construed as an intent to exclude other implementations. Artisans will understand how to implement the invention in the appended claims in many other ways, using equivalents and alternatives that do not depart from the scope of the following claims.

What is claimed is:

1. An apparatus comprising:
   an electro-mechanical machine housing; and
   a conductor routing element configured to route conductors from within the electro-mechanical machine housing to a location outside the housing, the conductor routing element including:
      base means, positioned proximate a first end of the conductor routing element, the base means configured to fit over a bottom portion of a first opening in the housing;
      routing means for carrying the conductors; and
      fastening means, positioned proximate a second end of the conductor routing element, the fastening means configured to secure the conductor routing element to the housing.

2. The apparatus of claim 1, wherein the electro-mechanical machine housing includes an electrical motor housing.

3. The apparatus of claim 1, wherein the conductors include signal carrying conductors coupled to a resolver in the electro-mechanical machine housing.

4. The apparatus of claim 1, wherein the conductors are coupled to a thermistor within the electro-mechanical machine housing.

5. The apparatus of claim 1, wherein the fastening means includes moveable means for securing the conductor routing element to the housing by way of a second opening in the housing.

6. The apparatus of claim 5, wherein the moveable means include two or more members separated by a continuous space, the members configured to allow the moving means to pass through the second opening in the housing.

7. The apparatus of claim 1, wherein the routing means includes a channel, for carrying conductors, formed in a shape corresponding to a profile of a portion of the housing.

8. The apparatus of claim 1, wherein the routing means routes the conductors from within the housing to the outside location through the first opening in the housing.

9. The apparatus of claim 8, wherein the routing means includes a channel, for carrying the conductors, formed in a shape corresponding to a profile of the first opening in the housing.

10. An apparatus comprising:
    an electro-mechanical machine housing; and
    a conductor routing element configured to selectively attach to the electro-mechanical machine housing, and route conductors from within the electro-mechanical machine housing to a location outside the housing, the routing element including:
       a base for fitting in a first opening in the housing;
       a routing channel for carrying conductors; and
       a fastener for securing the conductor routing element to the housing.

11. The apparatus of claim 10, wherein the electro-mechanical machine housing includes an electrical motor housing.

12. The apparatus of claim 10, wherein the conductors include signal carrying conductors coupled to a resolver in the electro-mechanical machine housing.

13. The apparatus of claim 10, wherein the conductors are couple to a thermistor within the electro-mechanical machine housing.

14. The apparatus of claim 10, wherein the fastener includes moveable means for securing the conductor routing element to the housing by way of a second opening in the housing.

15. The apparatus of claim 14, wherein the routing channel is configured to route the conductors from within the housing to the outside location through the first opening in the housing.

16. The apparatus of claim 14, wherein the moveable means include two or more members separated by a continuous space, the members configured to allow the moving means to pass through the second opening in the housing.

17. The apparatus of claim 10, wherein the routing channel is configured to route conductors from within the housing to the outside location through the first opening in the housing.

18. The apparatus of claim 10, wherein the routing channel is formed in a shape corresponding to a profile of a portion of the housing.

19. The apparatus of claim 10, wherein the routing channel is formed in a shape corresponding to a profile of the first opening in the housing.

* * * * *

UNITED STATES PATENT AND TRADEMARK OFFICE
CERTIFICATE OF CORRECTION

| | | |
|---|---|---|
| PATENT NO. | : 7,877,863 B2 | Page 1 of 1 |
| APPLICATION NO. | : 11/166264 | |
| DATED | : February 1, 2011 | |
| INVENTOR(S) | : Kyle Davidson | |

It is certified that error appears in the above-identified patent and that said Letters Patent is hereby corrected as shown below:

In column 10, lines 30-31, please amend "are couple to" to read --are coupled to--.

Signed and Sealed this
Twelfth Day of April, 2011

David J. Kappos
*Director of the United States Patent and Trademark Office*